US012213006B2

United States Patent
Suzuki

(10) Patent No.: US 12,213,006 B2
(45) Date of Patent: Jan. 28, 2025

(54) SYNCHRONOUS COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Motoharu Suzuki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/304,229

(22) Filed: Apr. 20, 2023

(65) Prior Publication Data

US 2023/0354100 A1 Nov. 2, 2023

(30) Foreign Application Priority Data

Apr. 27, 2022 (JP) ................................ 2022-072999

(51) Int. Cl.
*H04W 28/14* (2009.01)
*H04L 49/901* (2022.01)
*H04L 69/22* (2022.01)

(52) U.S. Cl.
CPC ........... *H04W 28/14* (2013.01); *H04L 49/901* (2013.01); *H04L 69/22* (2013.01)

(58) Field of Classification Search
None
See application file for complete search history.

(56) References Cited

U.S. PATENT DOCUMENTS

| 2019/0379610 A1* | 12/2019 | Srinivasan | ............ H04L 47/627 |
| 2021/0014177 A1* | 1/2021 | Kasichainula | ...... H04L 47/6295 |
| 2022/0352998 A1* | 11/2022 | Levi | ...................... H04L 43/106 |
| 2023/0050776 A1* | 2/2023 | Livne | .................. H04L 49/9047 |

FOREIGN PATENT DOCUMENTS

JP 2018191226 A 11/2018

* cited by examiner

*Primary Examiner* — Scott B Christensen
(74) *Attorney, Agent, or Firm* — Canon U.S.A., Inc. IP Division

(57) ABSTRACT

A synchronous communication apparatus includes an output unit configured to output a reception packet and a reception time stamp indicating a time when the reception packet is received, a first storage unit configured to store the reception packet, a second storage unit configured to store the reception time stamp, a determination unit configured to determine propriety of storage of the reception packet in the first storage unit, based on a free capacity of the first storage unit, and a processing unit configured to perform time synchronous processing using the reception packet stored in the first storage unit and the reception time stamp stored in the second storage unit, the processing unit being configured not to use the reception time stamp corresponding to the reception packet in a case where the determination unit determines that the reception packet is not storable.

15 Claims, 8 Drawing Sheets

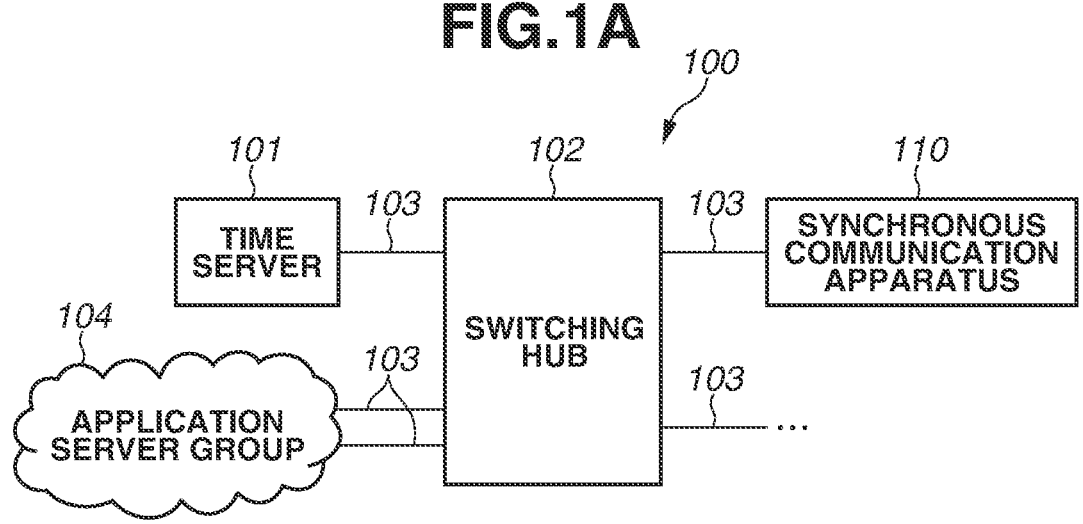
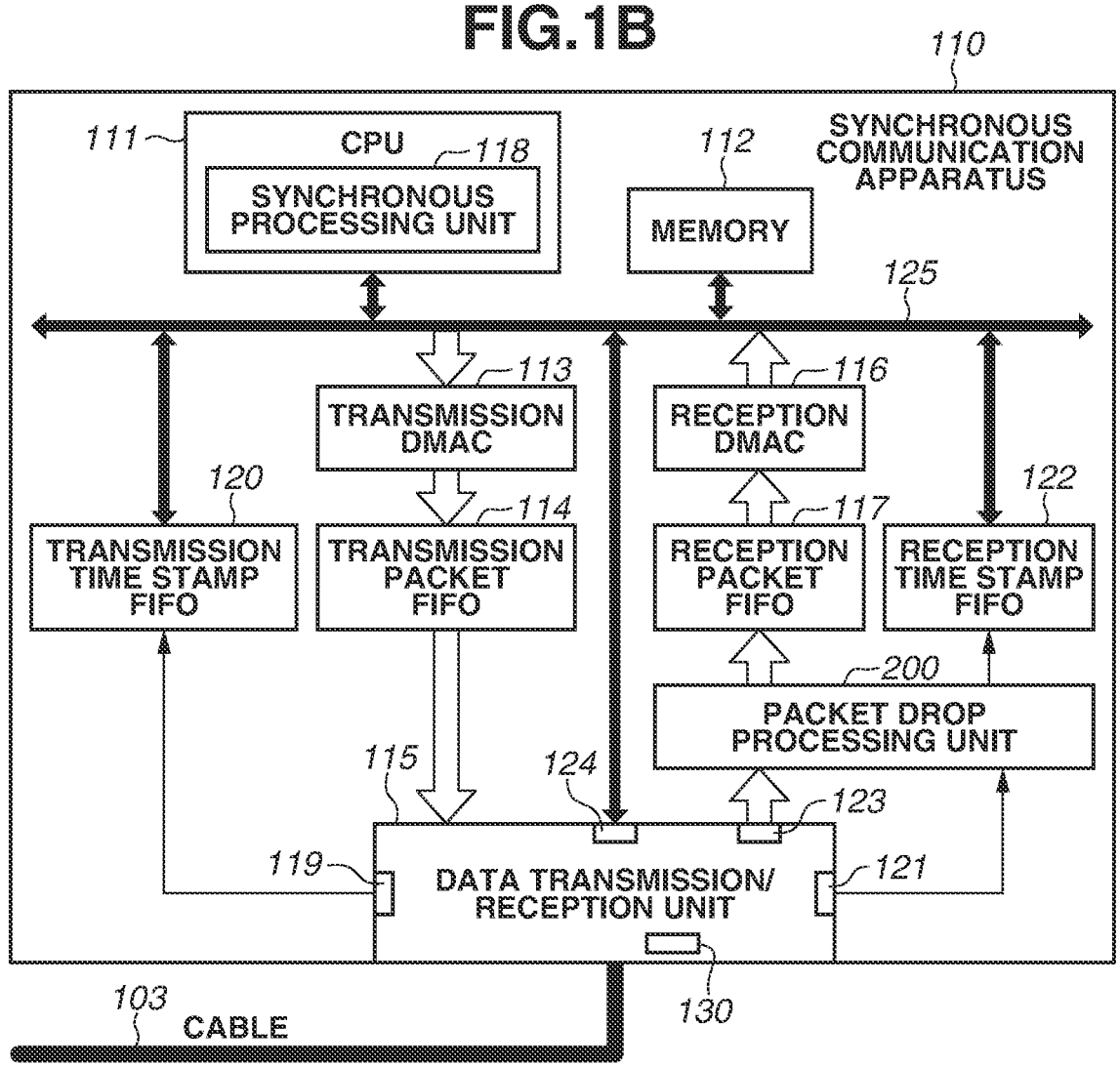

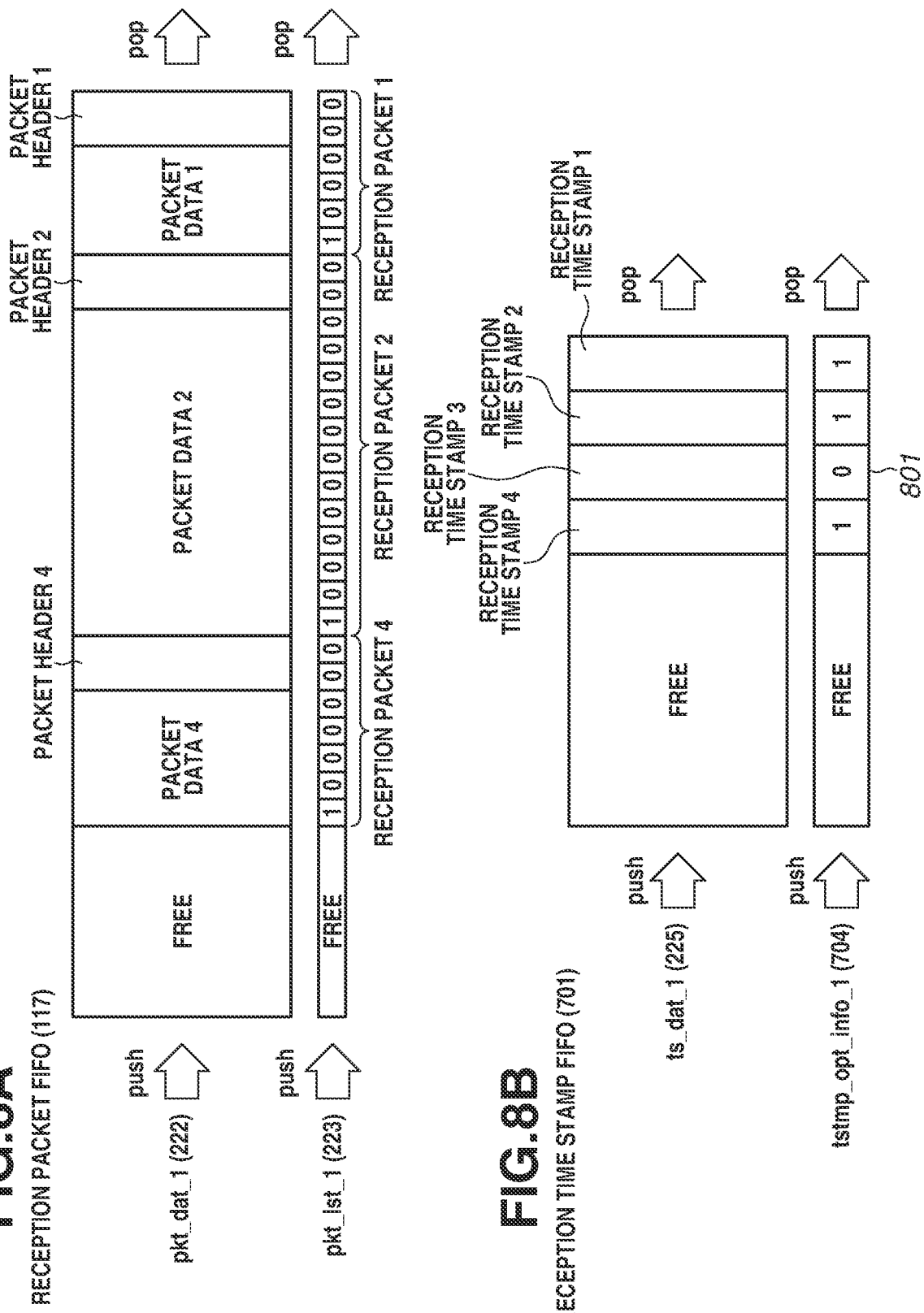

SYNCHRONOUS COMMUNICATION APPARATUS, METHOD OF CONTROLLING THE SAME, AND STORAGE MEDIUM

BACKGROUND OF THE DISCLOSURE

Field of the Disclosure

The present disclosure relates to a synchronous communication apparatus, a method of controlling the synchronous communication apparatus, and a storage medium.

Description of the Related Art

There is known a technique for performing synchronous communication using time stamps. Japanese Patent Application Laid-Open No. 2018-191226 discusses a technique for performing high-precision time synchronous processing by recording a time with a hardware clock (internal clock) in acquisition of a time stamp. A synchronous signal output apparatus discussed in Japanese Patent Application Laid-Open No. 2018-191226 includes a data transmission/reception unit that transmits/receives packets (data) to/from a time server (distribution source apparatus), and the internal clock generates/stores a time as a time stamp when transmission/reception of a packet is performed with the time server.

When the data transmission/reception unit outputs a reception time stamp and a reception packet through respective independent interfaces, it is necessary to guarantee the association between the reception time stamp and the reception packet. The number of reception packets and the number of reception time stamps output from the data transmission/reception unit are in agreement with each other. Thus, even when the reception packets and the reception time stamps are stored in different first-in first-out memories (hereinafter, simply referred to as FIFOs), the association between the reception packets and the reception time stamps is guaranteed by managing the storing orders of the reception packets and the reception time stamps individually.

However, when reception processing on packets other than precision time protocol (PTP) packets is performed with a high load, an event in which reception packets cannot be taken in the FIFO of the apparatus occurs due to an overflow of the FIFO. The size of a reception packet is different depending on each packet; however, all the reception time stamps has the same size irrespective of the packet type. This results in different occurrence timings of overflows of the FIFOs. Thus, it can occur that reception packets are not taken in the FIFO (the reception packets are lost in the apparatus), whereas reception time stamps, whose size is much smaller than the sizes of packets, are taken in a different FIFO. This means that inconsistency occurs in the association between the reception packets and the reception time stamps based on the storing orders. As a result, the inconsistency makes it difficult to provide high-precision synchronous processing.

SUMMARY OF THE DISCLOSURE

The present disclosure is directed to a synchronous communication apparatus that appropriately performs synchronous processing even if inconsistency occurs in the association between reception packets and reception time stamps in the apparatus.

According to an aspect of the present disclosure, a synchronous communication apparatus includes an output unit configured to output a reception packet and a reception time stamp indicating a time when the reception packet is received, a first storage unit configured to store the reception packet, a second storage unit configured to store the reception time stamp, a determination unit configured to determine propriety of storage of the reception packet in the first storage unit, based on a free capacity of the first storage unit, and a processing unit configured to perform time synchronous processing using the reception packet stored in the first storage unit and the reception time stamp stored in the second storage unit, the processing unit being configured not to use the reception time stamp corresponding to the reception packet in a case where the determination unit determines that the reception packet is not storable.

Further features of the present disclosure will become apparent from the following description of exemplary embodiments with reference to the attached drawings.

BRIEF DESCRIPTION OF THE DRAWINGS

FIG. 1A illustrates the outline of a system including a synchronous communication apparatus according to a first exemplary embodiment.

FIG. 1B is a block diagram illustrating details of the synchronous communication apparatus in FIG. 1A.

FIGS. 8A and 8B are diagrams illustrating buffering states of respective FIFOs according to the second exemplary embodiment.

DESCRIPTION OF THE EMBODIMENTS

Figure 2:
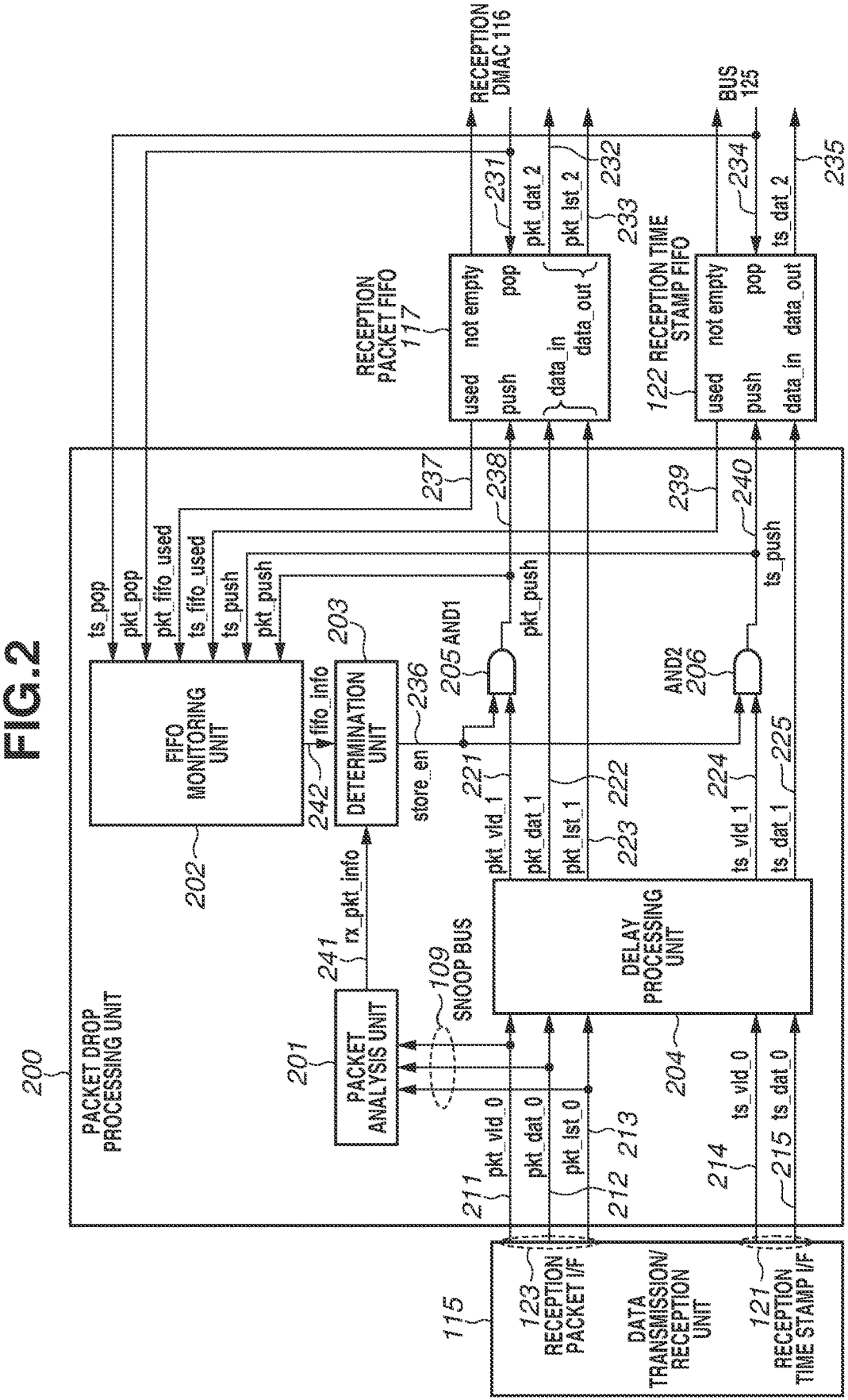
FIG. 2 is a block diagram of a packet drop processing unit.

Some exemplary embodiments will be described in detail below with reference to the accompanying drawings. The following exemplary embodiments do not limit the present disclosure according to the claims. A plurality of features are described in the exemplary embodiments, but not all of the features are required for the present disclosure, and any combination from among the features may be used. In the accompanying drawings, like numbers refer to like components, and repetitive descriptions will be omitted.

<System>

A first exemplary embodiment will be described. FIG. 1A illustrates an example of a system 100 to which the present disclosure is applicable. The system 100 includes a time server 101, a switching hub 102, a synchronous communication apparatus 110, and an application server group 104. The time server 101 and the switching hub 102 are connected via one of cables 103 (network). The switching hub 102 and the synchronous communication apparatus 110 are also connected via one of the cables 103. The switching hub 102 and the application server group 104 are connected via two or more of the cables 103 (illustrated by two lines in drawing). Another synchronous communication apparatus 110 may be connected to the cable 103 extending from the lower right part of the switching hub 102.

As a technique for synchronizing a time between apparatuses connected through cables (network) or the like, The Institute of Electrical and Electronics Engineers (IEEE) 1588v2 standard is used. When synchronous communication compliant with IEEE1588v2 is performed in the system 100, the synchronous communication apparatus 110 performs time synchronization by exchanging a packet called a precision time protocol (PTP) packet between a distribution source apparatus (time server 101) and a synchronization destination apparatus (synchronous communication apparatus 110). To perform time synchronous processing, the synchronous communication apparatus 110 uses a time when the packet transmitted from the time server 101 is received by the synchronous communication apparatus 110 (hereinafter, referred to as "reception time stamp"). In addition, the synchronous communication apparatus 110 uses a transmission time of the PTP packet (hereinafter, referred to as "transmission time stamp") transmitted from the synchronous communication apparatus 110 to the time server 101 when the time synchronous processing is performed.

The time server 101 has the function of distributing times, and distributes times for the synchronous communication apparatus 110 to perform time synchronization with the time server 101. The switching hub 102 has a transparent clock (hereinafter, referred to as "TC") function. The TC function measures the time of the PTP packet staying in the switching hub 102, adding the measured staying time to the PTP packet, and bridging the PTP packet. The switching hub 102 can transmit/receive transmission control protocol/internet protocol (TCP/IP) packets and other types of packets. The synchronous communication apparatus 110 is, for example, an imaging apparatus having a communication function, or a display apparatus including a display.

The cables 103 are Ethernet® cables, and the apparatuses (time server 101, switching hub 102, synchronous communication apparatus 110, and application server group 104) are connected through Ethernet®.

The application server group 104 consists of one or more servers each providing a service to the synchronous communication apparatus 110. The application server group 104 may include, for example, a server in which files can be read and written from outside, such as a file server, and an image distribution server that can distribute moving images. When the synchronous communication apparatus 110 has a display function, the synchronous communication apparatus 110 can display moving images distributed by the image distribution server.

In the present exemplary embodiment, the following is a description on the premise that the application server group 104 includes the image distribution server, and that the image distribution server distributes images to the synchronous communication apparatus 110. An EtherType value of a packet used in image distribution is 0x01FF, and the maximum packet length of an image transmission packet does not exceed 8000 bytes.

<Synchronous Communication Apparatus>

FIG. 1B illustrates details of the synchronous communication apparatus 110. The synchronous communication apparatus 110 includes a central processing unit (CPU) 111, a memory 112, a transmission direct memory access controller (DMAC) 113, a transmission packet first-in first-out (FIFO) memory 114, a data transmission/reception unit 115, a reception DMAC 116, a reception packet FIFO memory 117, and a synchronous processing unit 118. The synchronous communication apparatus 110 further includes a transmission time stamp interface (I/F) 119, a reception time stamp I/F 121, a reception time stamp FIFO memory 122, a reception packet I/F 123, a time adjustment I/F 124, a packet drop processing unit 200, and an internal clock 130. A bus 125 is disposed inside the synchronous communication apparatus 110. In the following description, the FIFO memory is simply referred to as "FIFO".

The CPU 111 is a module generally controlling the synchronous communication apparatus 110.

The synchronous processing unit 118 is provided as a program operating in the CPU 111, and has the function of synchronizing the synchronous communication apparatus 110 with the time server 101. More specifically, the synchronous processing unit 118 calculates a time difference with the time server 101 and a network delay time by using a PTP packet. Further, based on the calculation result, the synchronous processing unit 118 performs correction processing on the time of the internal clock 130 of the data transmission/reception unit 115. The correction processing is performed through the time adjustment I/F 124.

The memory 112 stores programs to be run by the CPU 111, packets received from the other apparatuses, and packets to be transmitted to the other apparatuses.

The transmission DMAC 113 reads a packet from the memory 112 and transfers the packet to the transmission packet FIFO 114 based on an instruction from the CPU 111.

The transmission packet FIFO 114 temporarily stores a transmission packet transmitted from the transmission DMAC 113, and transmits the transmission packet to the data transmission/reception unit 115.

The data transmission/reception unit 115 transmits the transmission packet received from the transmission packet FIFO 114 to the cable 103. The time when the data transmission/reception unit 115 transmits the packet is output as a transmission time stamp from the transmission time stamp I/F 119. In addition, the data transmission/reception unit 115 outputs a reception packet received from the cable 103, from the reception packet I/F 123. The data transmission/reception unit 115 generates a reception time stamp at the timing when the reception packet is received, and outputs the reception time stamp from the reception time stamp I/F 121. The data transmission/reception unit 115 includes the internal clock 130 to generate the transmission/reception time stamps. The internal clock 130 may be disposed outside the data transmission/reception unit 115 as long as the time can be used by the data transmission/reception unit 115 and can be corrected by the synchronous processing unit 118.

The reception packet FIFO 117 temporarily stores the reception packet transmitted from the packet drop processing unit 200, and transmits the reception packet to the reception DMAC 116 in response to a request from the reception DMAC 116. The total capacity of the reception packet FIFO 117 is previously known.

The reception time stamp FIFO 122 is an FIFO storing the reception time stamp output from the packet drop processing unit 200. The reception time stamp FIFO 122 is accessible from the synchronous processing unit 118 through the bus 125. The reception DMAC 116 transfers data read out from the reception packet FIFO 117, to the memory 112.

When the data transmission/reception unit 115 stores the packet in the reception packet FIFO 117, the packet drop processing unit 200 determines whether the packet is normally storable. If it is determined that the packet is not normally storable, the packet drop processing unit 200 performs processing for not storing the packet in the reception packet FIFO 117. Further, the packet drop processing unit 200 performs control to store/not to store the reception time stamp output from the reception time stamp I/F 121 in the reception time stamp FIFO 122, and processing for storing information accompanying the reception time stamp together if the reception time stamp is stored in the reception time stamp FIFO 122. Details of the control and the processing performed by the packet drop processing unit 200 will be described below.

<Packet Drop Processing Unit>

Details of the packet drop processing unit 200 will now be described with reference to FIG. 2. Various kinds of signals input/output by peripheral modules (data transmission/reception unit 115, reception DMAC 116, reception packet FIFO 117, reception time stamp FIFO 122, etc.) for description of the packet drop processing unit 200 will be also described. The packet drop processing unit 200 includes a packet analysis unit 201, a FIFO monitoring unit 202, a determination unit 203, a delay processing unit 204, and two AND circuits 205 and 206. In the following description, the two AND circuits are referred to as AND1 and AND2 in some cases.

The packet drop processing unit 200 includes digital circuitry, and wholly operates with clock signals. The reception packet I/F 123 of the data transmission/reception unit 115 is an interface outputting reception packets, and includes three signal lines: signals pkt_vld_0 (211), pkt_dat_0 (212), and pkt_lst_0 (213). The signal pkt_vld_0 (211) is a signal asserted to one when the data transmission/reception unit 115 outputs a reception packet. The signal line for the signal pkt_dat_0 (212) is a signal line to which the reception packet is output, and data including a reception packet is appropriately output from its head in groups of a predetermined number of bytes. The signal pkt_lst_0 (213) is last information that is output (asserted to one) together with the last data when data output to the signal pkt_dat_0 (212) is the last data of the packet.

The reception time stamp I/F 121 includes two signal lines for signals ts_vld_0 (214) and ts_dat_0 (215). The signal ts_vld_0 (214) is a signal asserted to one only at the timing when a reception time stamp is output. The signal ts_dat_0 (215) indicates a value of a reception time stamp. At the timing when the data transmission/reception unit 115 receives a packet, a value of the internal clock 130 of the data transmission/reception unit 115 is output as the value of the reception time stamp.

The delay processing unit 204 delays signals of the reception packet I/F 123 and the reception time stamp I/F 121 output from the data transmission/reception unit 115 by a certain clock cycle, and outputs the delayed signals.

The reception packet FIFO 117 is a FIFO storing reception packets output from the delay processing unit 204. At the timing when a signal pkt_push (238) is asserted, the reception packet FIFO 117 stores signals pkt_dat_1 (222) and pkt_lst_1 (223). Further, when a signal pkt_pop (231) is asserted in response to a transfer request from the reception DMAC 116, the reception packet FIFO 117 outputs signals pkt_dat_2 (232) and pkt_lst_2 (233).

The reception time stamp FIFO 122 is a FIFO storing reception time stamps output from the delay processing unit 204. At the timing when a signal ts_push (240) is asserted, the reception time stamp FIFO 122 stores a signal ts_dat_1 (225).

When a signal ts_pop (234) is asserted in response to an access request from the synchronous processing unit 118, the reception time stamp FIFO 122 outputs a signal ts_dat_2 (235).

The packet analysis unit 201 acquires reception packets flowing through the reception packet I/F 123 through a snoop bus 109 and analyzes the reception packets, and outputs a signal rx_pkt_info (241) as an analysis result, to the determination unit 203.

The FIFO monitoring unit 202 monitors various kinds of signals connected to the reception packet FIFO 117 and the reception time stamp FIFO 122, and outputs a signal fifo_info (242) as FIFO status information.

The determination unit 203 determines whether a reception packet output from the delay processing unit 204 is storable in the reception packet FIFO 117. The determination is performed based on the signals rx_pkt_info (241) and fifo_info (242). Thereafter, the determination unit 203 outputs a signal store_en (236) as a determination result.

The AND1 (205) is an element performing AND calculation with a signal pkt_vld_1 (221) and the signal store_en (236). The AND1 (205) masks the signal pkt_vld_1 (221) as an output timing signal of the reception packet, with the signal store_en (236) as a storage propriety signal for the reception packet FIFO 117, and inputs the resultant signal to the reception packet FIFO 117.

The AND2 (206) is an element performing AND calculation with a signal ts_vld_1 (224) and the signal store_en (236). The AND2 (206) masks the signal ts_vld_1 (224) as an output timing signal of the reception time stamp, with the signal store_en (236) as a storage propriety signal for the reception packet FIFO 117, and inputs the resultant signal to the reception time stamp FIFO 122.

The reception packet FIFO 117 inputs the number of stages used of the reception packet FIFO 117 to the FIFO monitoring unit 202 with a signal pkt_fifo_used (237).

The reception time stamp FIFO 122 inputs the number of stages used of the reception time stamp FIFO 122 to the FIFO monitoring unit 202 with a signal ts_fifo_used (239).

The synchronous processing unit 118 is described as a program operating in the CPU 111. The synchronous processing unit 118 may be implemented by dedicated hardware, such as an application specific integrated circuit (ASIC).

<Processing by FIFO Monitoring Unit>

Figure 3:
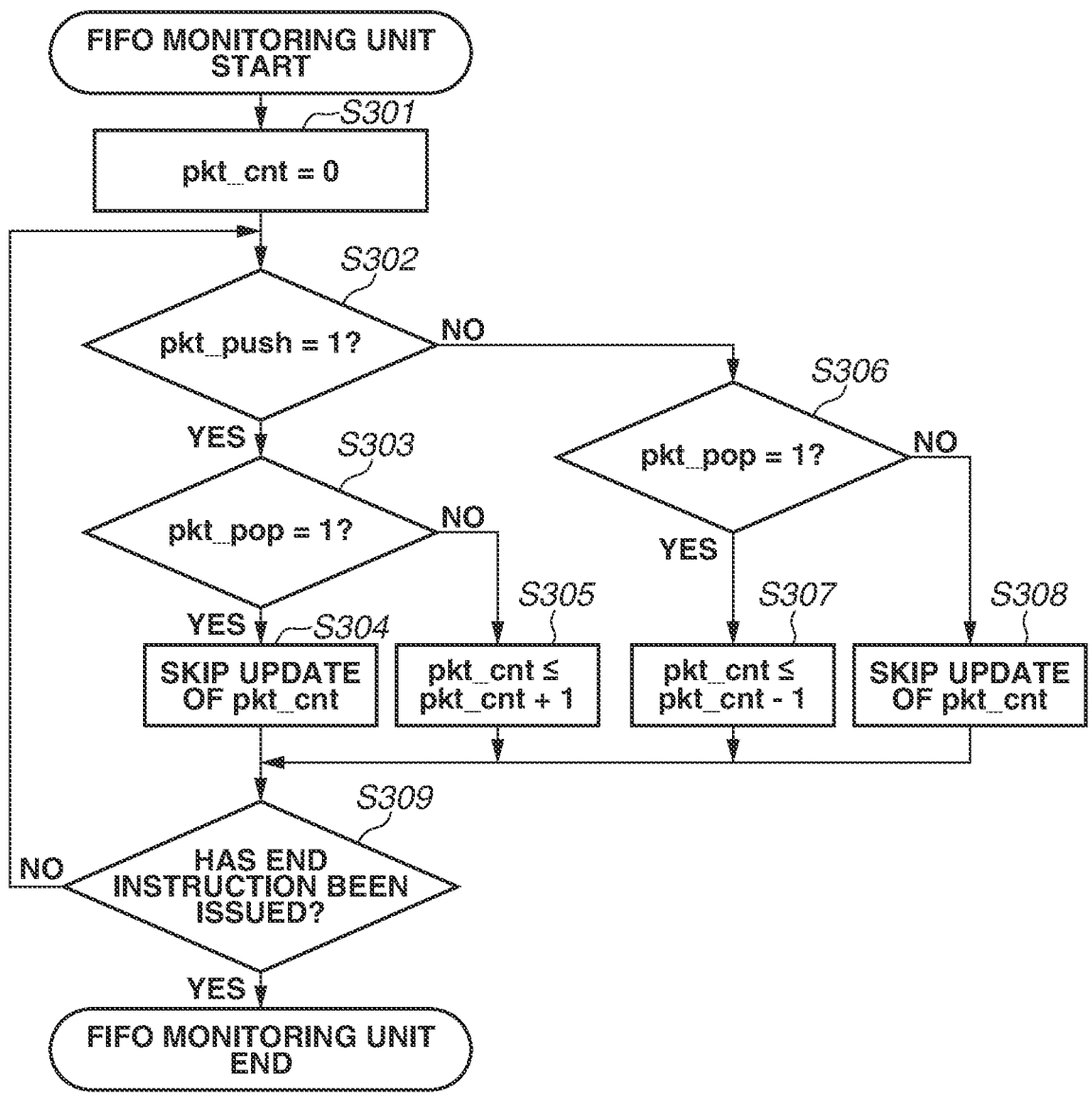
FIG. 3 is a flowchart illustrating processing by a first-in first-out (FIFO) monitoring unit.

Processing by the FIFO monitoring unit 202 will now be described. FIG. 3 is a flowchart about operation (increment, decrement, maintenance/skipping of update) of a signal pkt_cnt that is managed in the FIFO monitoring unit 202 and represents the number of stages used of the reception packet FIFO 117.

In step S301, the signal pkt_cnt is initialized. In FIG. 3, by the processing in steps S302 to S308, the signal pkt_cnt is operated based on values of the signals pkt_push (238) and pkt_pop (231). In the following, the operation will be described in detail.

In step S302, it is determined whether the signal pkt_push (238) is one. If the determination result is YES (YES in step S302), the processing proceeds to step S303. Otherwise (NO in step S302), the processing proceeds to step S306.

In step S303, it is determined whether the signal pkt_pop (231) is one. If the determination result is YES (YES in step S303), the processing proceeds to step S304. Otherwise (NO in step S303), the processing proceeds to step S305.

In step S306, it is also determined whether the signal pkt_pop (231) is one. If the determination result is YES (YES in step S306), the processing proceeds to step S307. Otherwise (NO in step S306), the processing proceeds to step S308.

When the processing proceeds to step S304, namely, when the signals pkt_push (238) and pkt_pop (231) are both one, the signal pkt_cnt is not updated.

When the processing proceeds to step S305, namely, when the signal pkt_push (238) is one and the signal pkt_pop (231) is zero, the signal pkt_cnt is incremented.

When the processing proceeds to step S307, namely, when the signal pkt_push (238) is zero and the signal pkt_pop (231) is one, the signal pkt_cnt is decremented.

When the processing proceeds to step S308, namely, when the signals pkt_push (238) and pkt_pop (231) are both zero, the signal pkt_cnt is not updated.

The processing is continued until an end instruction is issued from a user in step S309. The end instruction is transmitted, for example, from the application server group 104 to the synchronous communication apparatus 110.

The FIFO monitoring unit 202 calculates a usage of the reception packet FIFO 117 by multiplying the value of the signal pkt_cnt by the bus width of the signal pkt_dat_1 (222). As the total capacity of the reception packet FIFO 117 is previously known, a value obtained by subtracting the usage from the total capacity is regarded as a free capacity of the reception packet FIFO 117. The FIFO monitoring unit 202 outputs the free capacity as a signal fifo_info (242).

<Processing by Packet Analysis Unit>

Figure 4:
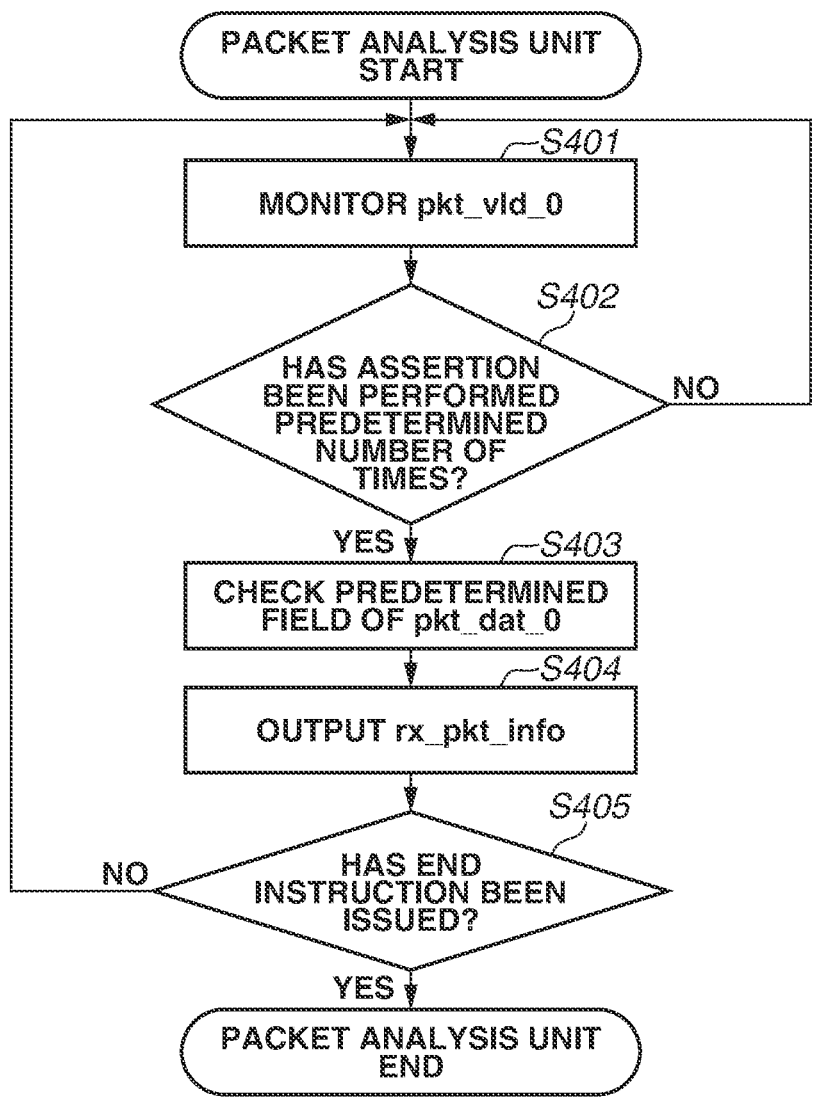
FIG. 4 is a flowchart illustrating processing by a packet analysis unit.

Processing by the packet analysis unit 201 will now be described with reference to FIG. 4.

In step S401, the packet analysis unit 201 continuously monitors the signal pkt_vld_0 (211). In the present exemplary embodiment, the packet analysis unit 201 continues the monitoring until the signal pkt_vld_0 (211) is asserted a predetermined number of times (predetermined number of cycles) in step S402.

If an EtherType field of the reception packet is put into a state of being output to the signal pkt_dat_0 (212) (YES in step S402), the packet analysis unit 201 checks the EtherType field in step S403.

In step S404, the packet analysis unit 201 outputs the value of the EtherType field as the signal rx_pkt_info (241).

The analysis processing is performed on each packet until an end instruction is issued from the user in step S405.

<Processing by Packet Analysis Unit and Determination Unit>

Figure 5:
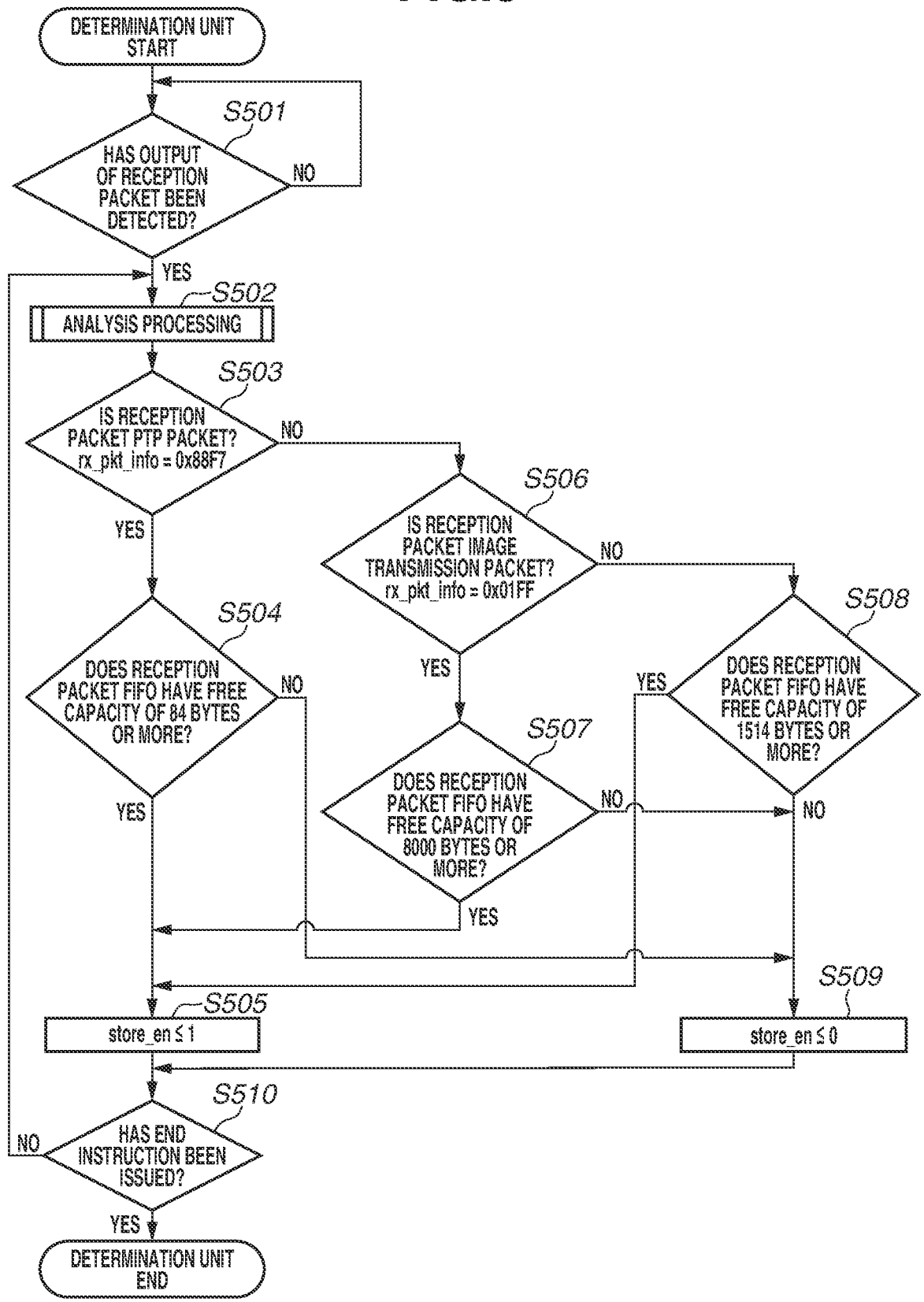
FIG. 5 is a flowchart illustrating processing by a determination unit.

Processing by the packet analysis unit 201 and the determination unit 203 will now be described with reference to FIG. 5.

In step S501, the packet analysis unit 201 determines whether the output of the reception packet has been detected. If the determination result is YES (YES in step S501), the processing proceeds to step S502. Otherwise (NO in step S501), the processing in step S501 is repeated.

In step S502, the packet analysis unit 201 performs analysis processing. In the present exemplary embodiment, the determination unit 203 performs determination processing in steps S503 to S509, based on the result of the analysis in step S502. In step S503, it is determined whether the reception packet is a PTP packet. If the determination result is YES (YES in step S503), the processing proceeds to step S504. Otherwise (NO in step S503), the processing proceeds to step S506. In step S506, it is determined whether the reception packet is an image transmission packet. If the determination result is YES (YES in step S506), the processing proceeds to step S507.

If the determination result is NO (NO in step S506), the processing proceeds to step S508. Further, in step S505 or S509, the signal store_en is asserted or made zero based on the determination result in step S504, the determination result in step S507, or the determination result in step S508. In the following, the processing will be described in detail.

If the reception packet is a PTP packet (YES in step S503) and the reception packet FIFO 117 has a free capacity of 84 bytes or more (YES in step S504), the determination unit 203 determines that the reception packet is storable, and asserts the signal store_en in step S505.

If the reception packet is an image transmission packet (YES in step S506) and the reception packet FIFO 117 has a free capacity of 8000 bytes or more (YES in step S507), the determination unit 203 determines that the reception packet is storable, and asserts the signal store_en in step S505.

If the processing proceeds to step S508, namely, if the reception packet is neither a PTP packet nor an image transmission packet, the determination unit 203 determines whether the reception packet FIFO 117 has a free capacity of 1514 bytes or more. If the determination result in step S508 is YES (YES in step S508), the determination unit 203 determines that the reception packet is storable, and asserts the signal store_en in step S505.

In a case other than the above-described cases, namely, if the determination result in step S504 is NO (NO in step S504), if the determination result in step S507 is NO (NO in step S507), or if the determination result in step S508 is NO (NO in step S508), the determination unit 203 determines that the reception packet is not storable in the reception packet FIFO 117, and makes the signal store_en zero in step S509.

The determination processing is also performed on each packet until an end instruction is issued from the user in step S510.

As described in steps S503 to S509, it is suitable that the threshold for the free capacity of the reception packet FIFO 117 is changed (set) depending on the packet type. For example, the PTP packet is storable even when the free capacity is small because the PTP packet does not generally have data of a large size. Thus, in the present exemplary embodiment, the threshold (threshold in step S504) for the PTP packet is set to 84 bytes. The threshold may be set to an appropriate value based on the use environment. In the present exemplary embodiment, the image transmission packet is handled as a jumbo packet having an upper limit of 8000 bytes. Thus, the threshold (threshold in step S507) for the image transmission packet is set to 8000 bytes. In addition, the threshold (threshold in step S508) for a packet other than the PTP packet and the image transmission packet is set to 1514 bytes in the present exemplary embodiment. The value of a maximum transmission unit (MTU) generally used in Ethernet® is 1500 bytes. Thus, 1514 bytes, a value obtained by adding 14 bytes of a media access control (MAC) header to 1500 bytes, is used as the threshold in step S508. Further, a specific threshold may be set for each of the other specific protocols.

<Operation of Sub-blocks Configuring Packet Drop Processing Unit>

Figure 6:
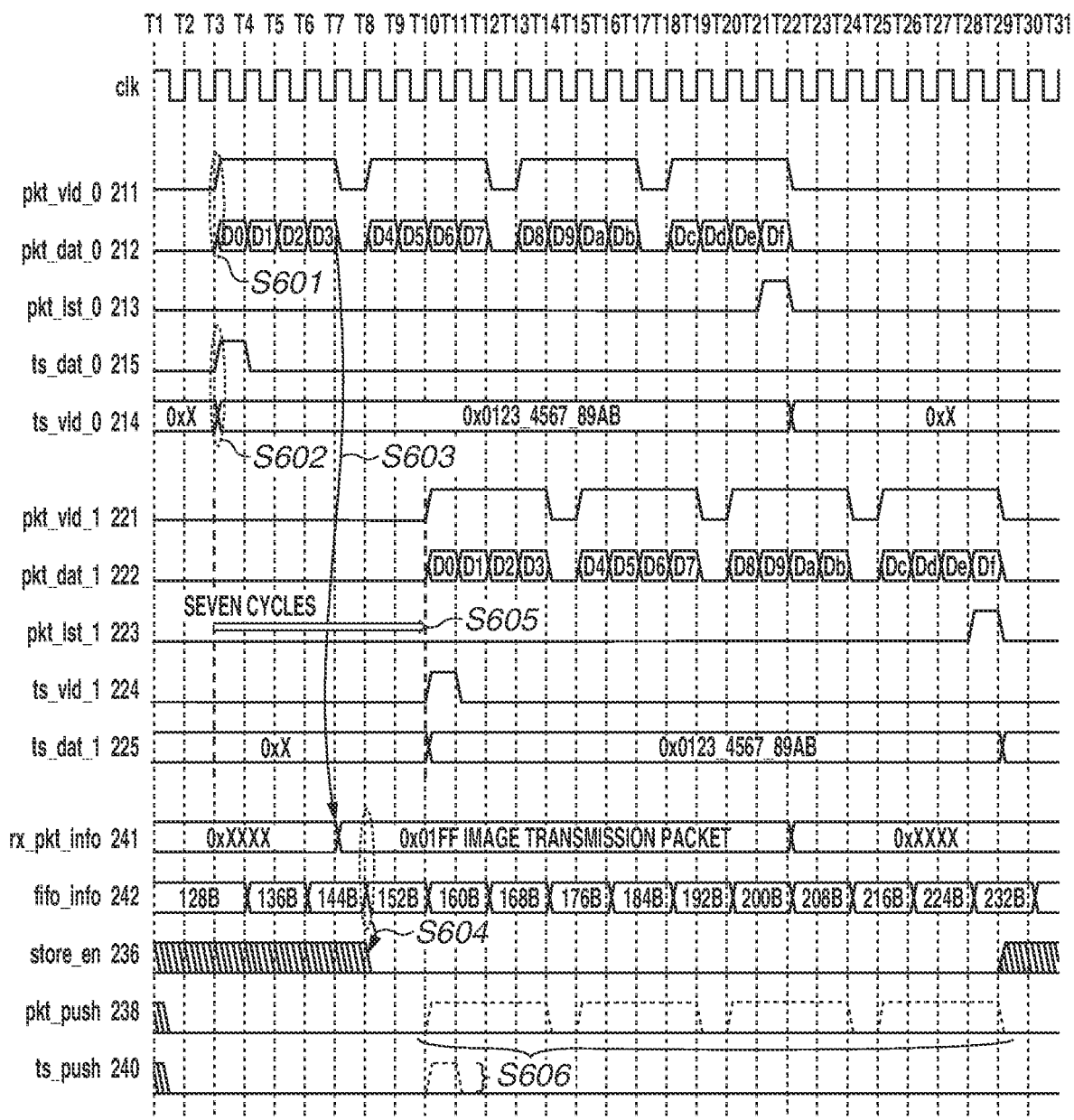
FIG. 6 is a timing chart of the packet drop processing unit.

Cooperation and operation of sub-blocks constituting the packet drop processing unit 200 will now be described with reference to FIG. 6. FIG. 6 is a timing chart of internal signals of the packet drop processing unit 200.

In step S601 at time T3, the data transmission/reception unit 115 starts output of reception packets. In addition, in step S602 at time T3, the data transmission/reception unit 115 outputs reception time stamps. Further, it is unnecessary to output the reception time stamp at the same time when a reception packet is output as long as the reception time stamp is passed to the synchronous processing unit 118 at an appropriate timing.

When the signal pkt_vld_0 (211) is asserted from its head of the packet a predetermined number of times, the EtherType field appears in the signal pkt_dat_0 (212). Thus, in step S603, the value of the EtherType field is stored in the signal rx_pkt_info (241). In the example of FIG. 6, it is assumed that the image transmission packet (EtherType=0×01FF) is received. In step S604, after the information on both of the signals rx_pkt_info (241) and fifo_info (242) is obtained, the determination unit 203 outputs a determination result. In the example of FIG. 6, the free capacity of the reception packet FIFO 117 is 144 bytes (i.e., less than 8000 bytes) at the time when the image transmission packet is received. This causes the determination unit 203 to output a determination result indicating that the reception packet is not storable (signal store_en (236)=0).

On the other hand, the reception packet and the reception time stamp output from the data transmission/reception unit 115 are delayed by seven cycles by the delay processing unit 204, and transmitted to the reception packet FIFO 117 and the reception time stamp FIFO 122 in step S605. However, as the signal store_en (236) is zero, the signal pkt_push (238) is zero, and the signal ts_push (240) is also zero. Thus, in step S606, the data (reception packet and reception time stamp) is not pushed to the reception packet FIFO 117 and the reception time stamp FIFO 122. In other words, the reception packet is discarded, and the reception time stamp is also discarded. This holds the consistency of a reception packet and the reception time stamp. This makes it possible for the number of stored packets and the number of stored time stamps to be equal to each other. Further, the discard of a reception time stamp may be represented as unuse of the reception time stamp.

As described above, the synchronous communication apparatus 110 according to the present exemplary embodiment is a synchronous communication apparatus that can appropriately cope with a packet loss in the apparatus. Even if a packet loss occurring inside the apparatus (synchronous communication apparatus 110) is detected, the synchronous communication apparatus 110 can continue high-precision synchronization.

In the present exemplary embodiment, when it is determined that a reception packet is not storable in the reception packet FIFO 117, synchronous processing is performed without using the reception time stamp corresponding to the reception packet. According to the present exemplary embodiment, this provides high-precision synchronous processing even under situations where packet reception processing is tight and a packet is lost inside the apparatus.

Although a conventional synchronous communication apparatus has difficulty performing high-precision synchronous processing due to inconsistency of the correspondence relationship between the reception time stamp and a lost packet, the synchronous communication apparatus 110 according to the present exemplary embodiment does not cause such an event to occur.

The synchronization technique used in the system 100 is not limited to the technique compliant with IEEE1588v2. Further, in FIG. 1, the application server group 104 representing the plurality of application servers is connected to the switching hub 102; however, the system 100 may be configured such that one application server is connected to the switching hub 102.

A second exemplary embodiment of the present disclosure will be described with reference to FIG. 7 and FIGS. 8A and 8B. In the second exemplary embodiment, a packet drop processing unit 700 is used in place of the packet drop processing unit 200 in the first exemplary embodiment. Further, in the second exemplary embodiment, a reception time stamp FIFO 701 is used in place of the reception time stamp FIFO 122 in the first exemplary embodiment. In the following description, the descriptions of components, acts, and processing similar to those in the first exemplary embodiment will be omitted, and differences will be described. Like number in the first exemplary embodiment refer to like components, acts, and signals similar.

<Packet Drop Processing Unit>

Figure 7:
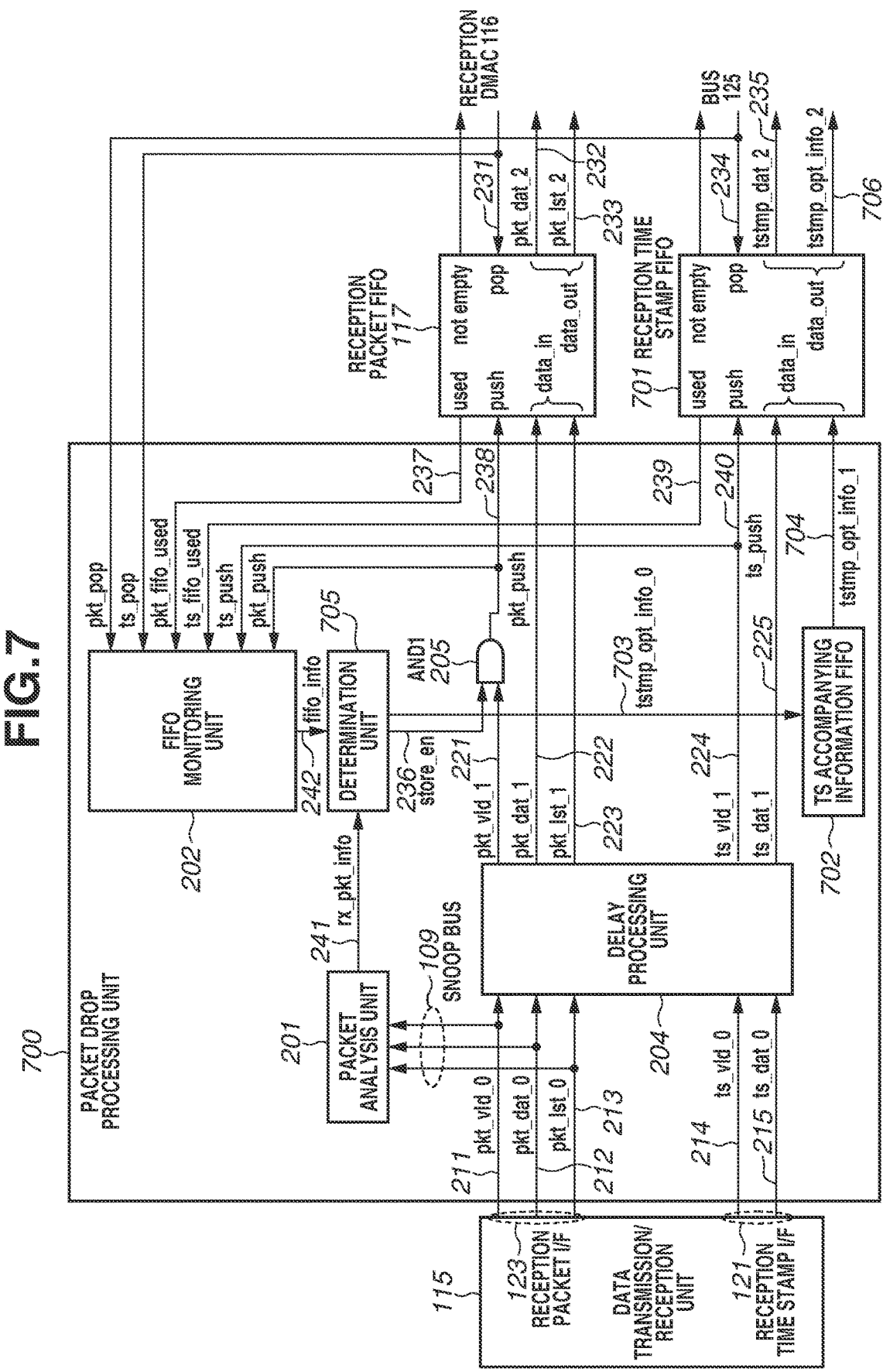
FIG. 7 is a block diagram of a packet drop processing unit according to a second exemplary embodiment.

FIG. 7 illustrates the packet drop processing unit 700 according to the second exemplary embodiment. The packet drop processing unit 700 includes the packet analysis unit 201, the FIFO monitoring unit 202, the delay processing unit 204, the AND circuit 205, a TS accompanying information FIFO 702, and a determination unit 705.

The TS accompanying information FIFO 702 is a FIFO storing information (accompanying information) accompanying each time stamp stored in the reception time stamp FIFO 701. The same number of pieces of accompanying information as the number of reception time stamps are stored from the determination unit 705 in the TS accompanying information FIFO 702.

In the present exemplary embodiment, flag information as the accompanying information indicating validity or invalidity of the reception time stamp is set (used). At a timing when the signal store_en (236) is controlled, one piece of flag information is set from the determination unit 705 to the TS accompanying information FIFO 702 via a signal tstamp_opt_info_0 (703). The information is also stored in the reception time stamp FIFO 701 (via signal tstamp_opt_info_1 (704)). Further, it is suitable that, at the same timing when the synchronous processing unit 118 acquires the reception time stamp (tstmp_dat_2 (235)), the flag information (tstmp_opt_info_2 (706)) can be acquired from the reception time stamp FIFO 701.

The signal masked with the signal store_en (236) is the signal pkt_vld_1 (221) alone, and the signal ts_vld_1 (224) is connected to the reception time stamp FIFO 701 without being masked (AND2 in FIG. 2 is absent).

<Data Stocked in FIFO>

Next, data stored (stocked) in the reception packet FIFO 117 and the reception time stamp FIFO 701 will be described with reference to FIGS. 8A and 8B. FIGS. 8A and 8B illustrate an example in which the reception packet FIFO 117 receives four packets (packet 1, packet 2, packet 3, and packet 4) from the data transmission/reception unit 115, and stores the three packets but the packet 3. FIG. 8A illustrates data in the reception packet FIFO 117, and FIG. 8B illustrates data in the reception time stamp FIFO 701. As illustrated in FIG. 8A, the reception packet 3 is not stored in the reception packet FIFO 117. As illustrated in FIG. 8B, the flag information of the TS accompanying information for the reception time stamp corresponding to the packet 3, which cannot be stored, is set to zero (invalid) and stored (801). This enables the synchronous processing unit 118 to confirm the consistency of the received PTP packets and the reception time stamps. In other words, if the flag information acquired with a reception time stamp in acquiring a PTP packet is zero, the reception time stamp is discarded. Further, the reception time stamp FIFO 701 is read until a time stamp with flag information indicating one is found. When a time stamp with flag information indicating one is found, the time stamp is used, which makes it possible to maintain the consistency of PTP packets and reception time stamps.

As described above, the synchronous communication apparatus 110 according to the present exemplary embodiment can also achieve effects similar to the effects in the first exemplary embodiment. In other words, the synchronous communication apparatus 110 can continue high-precision synchronization using the accompanying information (flag information) even if a packet loss occurring inside the apparatus (synchronous communication apparatus 110) is detected.

A modification of the second exemplary embodiment will be described as a third exemplary embodiment. In the second exemplary embodiment, flag information indicating validity/invalidity is set as information accompanying a reception time stamp. The accompanying information according to the present disclosure is not limited to the flag information indicating validity or invalidity. For example, information (identification information) allowing unique identification of a reception packet may be used as the accompanying information. More specifically, a field check sequence (FCS), an error detection code for a received packet, may be stored as the accompanying information in the TS accompanying information FIFO 702, in association with storage of the time stamp.

Further, when a PTP packet is received, the time stamp at a time when the FCS of the PTP packet and the FCS acquired from the reception time stamp FIFO 701 are in agreement with each other is associated with the PTP packet. This makes it possible to maintain the consistency of reception packets and reception time stamps. If a FCS is given to a reception packet, the packet analysis unit 201 reads the FCS and outputs the FCS from the signal rx_pkt_info (241). If no FCS is given, the packet analysis unit 201 may calculate the FCS. Furthermore, besides a FCS, a plurality of pieces of information, such as a packet type and a sequence number, may be combined and handled as the identification information (accompanying information).

The synchronous communication apparatus 110 according to the present exemplary embodiment can also achieve effects similar to the effects in the second exemplary embodiment. In other words, the synchronous communication apparatus 110 can continue high-precision synchronization using the accompanying information (flag information) even if a packet loss occurring inside the apparatus (synchronous communication apparatus 110) is detected.

<Modification of Determination Unit>

Each of the determination units 203 and 705 according to the first to third exemplary embodiments performs determination with necessary free capacities (using three thresholds (84 bytes, 8000 bytes, and 1514 bytes)) fixed depending on the packet type (PTP packet, image transmission packet, and other packets). As another determination method, determination may be made using results of calculation of a predetermined time for the amount of data (extraction data amount) extracted from the reception packet FIFO 117 or an average value (average extraction data amount) in a predetermined clock cycle by the FIFO monitoring unit 202. Given an average extraction data amount, the storage of a reception packet can be started even if the reception packet FIFO 117 does not have a free capacity sufficient for one packet in some cases. This is because, with a large average extraction data amount, the stored packet is extracted while the reception packet is stored in the FIFO (reception packet FIFO 117). The threshold value for a free capacity may be determined (changed) based on the average extraction data amount. The above-described average extraction data amount is an extraction data amount per unit time (predetermined time or predetermined clock cycle), and the average extraction data amount may be referred to as an average extraction data rate.

The packet analysis unit 201 may perform analysis of the packet length of a reception packet, as well as analysis of the type of the reception packet. In this case, the determination unit 203 may perform the determination using two analysis results (type and packet length of packet) from the packet analysis unit 201. Further, the packet analysis unit 201 may analyze the packet length of a reception packet alone, and the determination unit 203 may perform the determination based on the result of the analysis. For example, with a short packet length of a packet and a free capacity of less than 1514 bytes in step S508 in FIG. 5, the determination unit 203 may determine that the result is YES.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-072999, filed Apr. 27, 2022, which is hereby incorporated by reference herein in its entirety.

What is claimed is:

1. A synchronous communication apparatus comprising:
a first storage configured to store a reception packet;
a second storage configured to store a reception time stamp;
a memory which stores a computer program; and
at least one processor which executes the computer program to:
output the reception packet and the reception time stamp indicating a time when the reception packet is received; and
determine whether the reception packet is storable or not in the first storage, based on a free capacity of the first storage,
wherein the at least one processor is configured to perform time synchronous processing using the reception packet stored in the first storage and the reception time stamp stored in the second storage, wherein the at least one processor is configured not to use the reception time stamp corresponding to the reception packet in a case where it is determined that the reception packet is not storable, wherein the at least one processor is further configured to analyze at least a type of the reception packet, and it is determined whether the reception packet is storable or not, based on a first threshold value in a case where the type of the reception packet is a PTP packet, and based on a second threshold value in a case where the type of the reception packet is an image transmission packet, and wherein the first threshold value is different from the second threshold value.

2. The synchronous communication apparatus according to claim 1, wherein the at least one processor is further configured to, in the case where it is determined that the reception packet is not storable, cause the second storage not to store the reception time stamp.

3. The synchronous communication apparatus according to claim 1, wherein the at least one processor is further configured to store information corresponding to a determination result in the second storage, the information being accompanied by the reception time stamp, wherein, in the case where it is determined that the reception packet is not storable, the at least one processor does not use the reception time stamp accompanying the information corresponding to the determination result indicating that the reception packet is not storable.

4. The synchronous communication apparatus according to claim 1, wherein the at least one processor further acts as an accompanying storage unit configured to store identification information for identification of the reception packet in the second storage, the identification information being accompanied by the reception time stamp, wherein, only with the identification information on the reception packet and the identification information accompanying the reception time stamp in agreement with each other, the at least one processor uses the reception time stamp.

5. The synchronous communication apparatus according to claim 1, wherein the at least one processor analyzes a packet length of the reception packet.

6. The synchronous communication apparatus according to claim 1, wherein the at least one processor is configured to monitor a free capacity of the first storage or a speed at which data is extracted from the first storage, and wherein determination of whether the reception packet is storable or not is performed based on a monitoring result.

7. The synchronous communication apparatus according to claim 5, wherein the at least one processor is configured to monitor a free capacity of the first storage or a speed at which data is extracted from the first storage, and wherein determination of whether the reception packet is storable or not is performed based on a monitoring result.

8. The synchronous communication apparatus according to claim 1, wherein the synchronous communication apparatus performs synchronous communication compliant with Institute of Electrical and Electronics Engineers (IEEE) 1588v2.

9. The synchronous communication apparatus according to claim 5, wherein the synchronous communication apparatus performs synchronous communication compliant with IEEE1588v2.

10. The synchronous communication apparatus according to claim 6, wherein the synchronous communication apparatus performs synchronous communication compliant with IEEE1588v2.

11. The synchronous communication apparatus according to claim 1, wherein the first storage and the second storage are each a first-in first-out (FIFO) memory.

12. The synchronous communication apparatus according to claim 5, wherein the first storage and the second storage are each a FIFO memory.

13. The synchronous communication apparatus according to claim 6, wherein the first storage and the second storage are each a FIFO memory.

14. A method of controlling a synchronous communication apparatus, the synchronous communication apparatus including an output unit, a first storage unit, a second storage unit, and a synchronous processing unit, the method comprising:

outputting a reception packet and a reception time stamp indicating a time when the reception packet is received, from the output unit;

storing the reception packet in the first storage unit;

storing the reception time stamp in the second storage unit;

determining whether the reception packet is storable or not in the first storage unit based on a free capacity of the first storage unit; and performing, by the synchronous processing unit, time synchronous processing using the reception packet stored in the first storage unit and the reception time stamp stored in the second storage unit, wherein, in a case where it is determined that the reception packet is not storable in the determining, the reception time stamp corresponding to the reception packet is not used in the time synchronous processing, wherein at least a type of the reception packet is analyzed and it is determined whether the reception packet is storable or not, based on a first threshold value in a case where the type of the reception packet is a PTP packet, and based on a second threshold value in a case where the type of the reception packet is an image transmission packet, and wherein the first threshold value is different from the second threshold value.

15. A non-transitory storage medium storing a program causing a synchronous communication apparatus to execute a control method, the synchronous communication apparatus including an output unit, a first storage unit, a second storage unit, and a synchronous processing unit, the control method comprising:

outputting a reception packet and a reception time stamp indicating a time when the reception packet is received, from the output unit;

storing the reception packet in the first storage unit;

storing the reception time stamp in the second storage unit;

determining whether the reception packet is storable or not in the first storage unit based on a free capacity of the first storage unit; and performing, by the synchronous processing unit, time synchronous processing using the reception packet stored in the first storage unit and the reception time stamp stored in the second storage unit, wherein, in a case where it is determined that the reception packet is not storable in the determining, the reception time stamp corresponding to the reception packet is not used in the time synchronous processing, wherein at least a type of the reception packet is analyzed and it is determined whether the reception packet is storable or not, based on a first threshold value in a case where the type of the reception packet is a PTP packet, and based on a second threshold value in a case where the type of the reception packet is an image transmission packet, and wherein the first threshold value is different from the second threshold value.

* * * * *